Jan. 8, 1929.　　　　　　　　　　　　　　　　　　　　1,698,162
C. W. LYNCH
SWIVEL CONNECTION
Filed Jan. 24, 1927
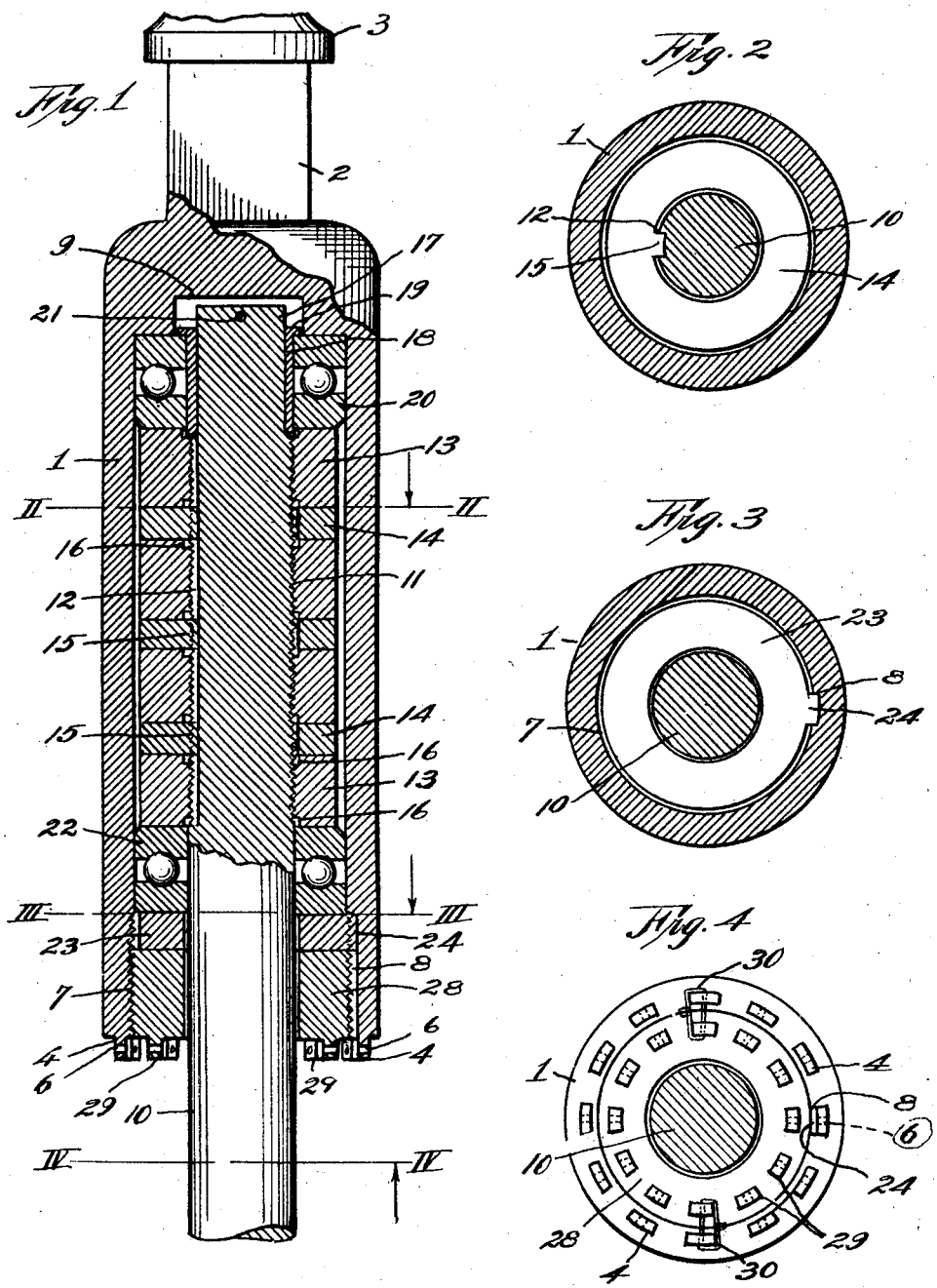
INVENTOR.
C. W. Lynch
BY
Thorpe Gerard　　ATTORNEYS.

Patented Jan. 8, 1929.

1,698,162

UNITED STATES PATENT OFFICE.

CHARLES W. LYNCH, OF PERRY, OKLAHOMA.

SWIVEL CONNECTION.

Application filed January 24, 1927. Serial No. 163,077.

This invention relates to anti-friction swivel connections for use in the pump or sucker rod line of oil wells and the like. It has been found desirable to insure the free suspension of sucker rods, particularly in deep wells, as such rods are frequently subjected to torsional strains leading to the snapping of the rods or the unscrewing of the joints due to the crookedness of the well hole. The device of the invention is designed to allow such strains to work out of the pump rods without breaking the parts or unscrewing any of the joints, and it is particularly designed for use adjacent the plunger rod of the pump to avoid the rotation of the pump within the barrel and the consequent rapid wear of the valve cups.

A further object is to produce a swivel joint of the type outlined of such form that the operative parts of the joint are efficiently protected from abrasion by sand or the like which may be present in the oil.

Another object is to produce a swivel connection having a double lock to insure against the accidental disconnection of the parts and which is of strong, durable, and inexpensive construction.

With the general objects named in view, the invention consists in certain novel and useful features of construction and organization of parts as hereinafter described and claimed; and in order that it may be fully understood, reference is to be had to the accompanying drawing, in which:—

Figure 1 is a central vertical section through a swivel connection embodying the invention.

Figure 2 is a section on the line II—II of Figure 1.

Figure 3 is a section on the line III—III of Figure 1.

Figure 4 is a section on the line IV—IV of Figure 1.

In the said drawing, where like reference characters identify corresponding parts in all of the figures, 1 indicates a tubular box provided at its upper end with a solid reduced rectangular neck portion 2 for engagement by a wrench or the like, and said neck portion terminates in an extension or rod 3 which is formed at its upper end (not shown) with a suitable threaded head for engagement with a sucker rod box or with a substitute of common or any preferred character. The box 1 is formed at its lower end with a castellated portion 4, each castellation having a locking wire receiving opening 6. The lower internal end of the box 1 is threaded as at 7 and is internally formed with a vertical locking groove 8 for a purpose which will hereinafter appear. The closed or upper end of the bore or cavity of the box 1 is reduced to form a recess 9 for reception of the upper end of the other member of the swivel joint.

The second member of the swivel joint of the invention comprises a rod 10 which terminates at its lower end in a threaded socket or the like (not shown) for connection with the upper end of a plunger rod or with the upper end of a sucker rod. The said rod 10 is threaded near its upper end as at 11 and the rod is also formed with a vertical locking groove 12.

Threaded on the rod 10 is a series of header nuts 13 and between each of said nuts a locking washer 14 is inserted, said locking washers having tongues 15 received within the groove 12 of the rod 10. This method of assembly efficiently locking the parts together as when they are tightly secured home they in effect form an integral part of the rod 10. It will be noted that the bore of each of the header nuts 13 is enlarged at its threaded edges as at 16, to insure the tight clamping of the nuts against the interposed washers, and it will also be noted that the header nuts 13 and the locking washers 14 are of slightly less diameter than the internal diameter of the box 1 so that they shall not rub against the box and lead to a binding of the parts, thus not only serving to space the roller bearings hereinafter described, but also stiffening the upper end of the rod 10.

The extremity of the rod 10 is reduced as at 17, and fitted around said reduced portion is a tubular bushing 18 having a top flange 19, said bushing enlarging or building up the reduced end of the rod so that an anti-friction roller bearing 20 snugly received within the box 1, may be of similar size to the lower roller bearing hereinafter referred to. As a precautionary measure to insure against the accidental loss of the parts when the swivel joint is dismantled, a cotter pin 21 is carried by the end of the rod 10 within the recess 9 of the box 1, as illustrated.

Snugly received within the box 1 and underlying the lowermost header nut 13, is a roller bearing 22 corresponding in size to the upper bearing 18. Abutting the under face of said bearing 22 is a locking washer 23 having a tongue 24 for engaging the slot 8 in the box 1, said washer being secured in position by an externally threaded retaining threaded plug 28 engaging the thread 7 of the box 1. The threaded plug 28 is formed on its face with a series of castellated portions 29 for cooperation with the castellated portions 4 of the box 1 in receiving a series of locking wires 30 or one continuous wire threaded through the parts, it being noted in this connection the castellated portions 4 are so spaced from the outer surface of the box 1 that they shall not be subjected to abrasion on the wall of the oil well casing.

It will be evident that the parts within the box 1 are efficiently protected against abrasion by sand or the like, but that the retaining threaded plug 28 and the lock washer 24 are of slightly greater diameter than the rod 10 to allow sufficient oil to work into the box for the proper lubrication of the parts. It will also be apparent that the structure may be readily dismantled by unscrewing the retaining threaded plug 28, after which the end of the rod 10 may be withdrawn from the box 1, and said rod 10 will carry with it the entire swivel assembly. When the device is in operation the upper and lower roller bearings positively insure that neither the nuts 13 interlocked with rod 10, nor the retaining nut 28 interlocked with the box 1, shall be subjected to torsional strains tending to unscrew the parts. It is also desirable to point out that besides the double locking feature of the invention, the parts are so proportioned and arranged that there can be no slap of the header nuts and locking washers against the wall of the box, the joint being as rigid as any other type of joint, the upper rod 3 being free to turn in one direction while the lower rod 10 may turn in the opposite direction or both rods may turn in the same direction but at different speeds. It is also desirable to mention that the end play of the swivel joint may be readily taken up or removed by screwing in the retaining threaded plug 28 at the bottom of the box 1, and that the bearings are spaced sufficiently far apart to insure a rigid anti-slapping construction.

From the above description it will be apparent that I have produced a device possessing the features of advantage set forth as desirable, and while I have described the preferred embodiment of the same, it is to be understood that I reserve the right to make all changes properly falling within the spirit and scope of the appended claims.

I claim:

1. A swivel joint comprising a box open at its lower end, and having an internal longitudinal groove, a rod projecting into said box and having a longitudinal groove, a washer on said rod having a tongue interlocked with said rod groove against rotation, nuts on said rod above and below said washer, a bearing interposed between and engaging the upper nut and the top of the box, a second bearing below the lower nut, a second tongued washer on said rod below and supporting the second bearing and having its tongue interlocked with the groove of the box, and a retaining threaded plug, through which the rod projects and on which the second washer rests, threaded in and closing the end of said box and retaining the parts in position.

2. A swivel joint comprising a tubular box open and internally threaded at its lower end, a rod disposed axially within the box and provided with a threaded portion and a longitudinal groove, a plurality of spaced washers fitting on the rod and having tongues engaging the groove thereof, nuts threaded on the rod and abutting opposite sides of the washers, an anti-friction bearing interposed between and engaging the top of the box and the topmost nut, a retaining threaded plug fitting around the rod and engaging the internal threads of the box, a washer fitting around the rod and resting on said threaded plug, and a ball bearing interposed between and bearing against said last-named washer and the undermost of said nuts upon the rod.

3. A swivel joint comprising a tubular box open and internally threaded at its lower end, a rod disposed axially within the box and provided with a threaded portion and a longitudinal groove, a plurality of spaced washers fitting on the rod and having tongues engaging the groove thereof, nuts threaded on the rod and abutting opposite sides of the washers, an anti-friction bearing interposed between and engaging the top of the box and the topmost nut, a retaining threaded plug fitting around the rod and engaging the internal threads of the box, a washer fitting around the rod and resting on said threaded plug, and a ball bearing interposed between and bearing against said last-named washer and the undermost of said nuts upon the rod, said box and the threaded plug threaded therein being castellated at their lower ends, and means connecting castellated portions of the box and threaded plug to lock them against relative rotation.

4. A swivel joint comprising a tubular box open and internally threaded at its lower end, a rod disposed axially within the box and provided with a threaded portion and a longitudinal groove, a plurality of spaced washers fitting on the rod and having tongues engaging the groove thereof, nuts threaded on the rod and abutting opposite sides of the washers, an anti-friction bearing interposed between and engaging the top of the box and the topmost nut, a retaining threaded plug fitting around the rod and engaging the internal threads of the box, a washer fitting around the rod and resting on said threaded plug, a ball bearing interposed between and bearing against said last-named washer and the undermost of said nuts upon the rod, a bushing fitting on the upper end of the rod and interposed between the same and the said first-mentioned ball bearing, and provided with an outwardly flanged upper end overlying the first-mentioned bearing and a cotter pin engaging the rod and overlying the flanged end of the bushing.

5. A swivel joint comprising a box, a threaded longitudinally-grooved rod projecting into the box, a thrust bearing on said rod and engaging one end of the box, a nut on said rod to hold the bearing in contact with the end of the box, a washer in contact with said nut and having a tongue interlocked with the groove of said rod, a second nut for maintaining the washer in position, and means for retaining the parts within said box.

6. A swivel joint comprising a box open at one end and longitudinally-grooved and internally threaded at said end, a threaded longitudinally-grooved rod projecting within the box, a thrust bearing on said rod, a threaded plug screwed into the open end of the box, a washer between said threaded plug and bearing and having a tongue interlocked with the groove of the box, a nut threaded on said rod and engaging the upper end of the bearing, a washer in contact with said rod nut and having a tongue interlocked with the groove of the rod, and a second nut on the rod for maintaining said washer in position.

In witness whereof I hereunto affix my signature.

CHARLES W. LYNCH.